(12) United States Patent
Murphy et al.

(10) Patent No.: US 7,775,092 B2
(45) Date of Patent: Aug. 17, 2010

(54) FUEL DELIVERY SYSTEM AND METHOD

(75) Inventors: Gregory P. Murphy, Janesville, WI (US); Matthew J. Weber, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 267 days.

(21) Appl. No.: 12/027,512

(22) Filed: Feb. 7, 2008

(65) Prior Publication Data
US 2009/0199626 A1 Aug. 13, 2009

(51) Int. Cl.
*G01M 15/02* (2006.01)
(52) U.S. Cl. .................................. 73/114.38; 73/114.55
(58) Field of Classification Search ............... 73/114.38, 73/114.41, 114.42, 114.43, 114.55
See application file for complete search history.

(56) References Cited

U.S. PATENT DOCUMENTS

| | | | |
|---|---|---|---|
| 3,778,706 A | 12/1973 | Thompson | |
| 4,083,248 A | 4/1978 | Maier | |
| 4,259,865 A | 4/1981 | Myers | |
| 4,296,472 A | 10/1981 | Sarkis | |
| 4,470,300 A | 9/1984 | Kobayashi | |
| 4,481,808 A | 11/1984 | Sakata et al. | |
| 4,646,070 A | 2/1987 | Yasuhara et al. | |
| 4,651,085 A | 3/1987 | Sakurai et al. | |
| 4,770,129 A | 9/1988 | Miyata et al. | |
| 4,912,319 A | 3/1990 | Miyata et al. | |
| 4,939,467 A | 7/1990 | Noglami et al. | |
| 4,939,468 A | 7/1990 | Takeuchi | |
| 5,005,402 A | 4/1991 | Pischinger et al. | |
| 5,033,293 A | 7/1991 | Honma et al. | |
| 5,110,205 A | 5/1992 | Suzuki et al. | |
| 5,126,570 A | 6/1992 | Boos | |
| 5,134,381 A | 7/1992 | Schmitz et al. | |
| 5,182,523 A | 1/1993 | Ertel et al. | |
| 5,196,801 A | 3/1993 | Nogami et al. | |
| 5,231,358 A | 7/1993 | Kapsokavathis et al. | |
| 5,261,270 A | 11/1993 | Gonze et al. | |
| 5,262,645 A | 11/1993 | Lambert et al. | |
| 5,313,168 A | 5/1994 | Ogawa | |
| 5,337,017 A | 8/1994 | Ogawa | |

(Continued)

OTHER PUBLICATIONS

PCT/US09/31941 International Search Report and Written Opinion, 11 pages, Dated Mar. 6, 2009.

*Primary Examiner*—Eric S McCall
(74) *Attorney, Agent, or Firm*—Michael Best & Friedrich LLP

(57) ABSTRACT

Systems and methods for determining a plurality of characteristics of a fuel and controlling a fuel delivery system based on the characteristics of the fuel. A controller generates a plurality of control signals. The control signals are transmitted to at least one ultrasonic transducer, a capacitance sensor, and a temperature sensor. Each of the ultrasonic transducer, capacitance sensor, and temperature sensor generate at least one output signal which is transmitted back to the controller. The controller determines, based on the output signals, the plurality of characteristics of the fuel. The characteristics of the fuel can include, for example, temperature, density, dielectric constant, and the like. The controller then compares the characteristics of the fuel to a set of characteristics of a first fuel type and a second fuel type and controls a fuel delivery device based on the characteristics of the fuel.

35 Claims, 9 Drawing Sheets

U.S. PATENT DOCUMENTS

| | | |
|---|---|---|
| 5,337,018 A | 8/1994 | Yamagishi |
| 5,367,264 A | 11/1994 | Brabetz |
| 5,414,367 A | 5/1995 | Ogawa |
| 5,488,311 A | 1/1996 | Kamioka et al. |
| 5,886,262 A | 3/1999 | Sinha |
| 6,057,693 A | 5/2000 | Murphy et al. |
| 6,250,137 B1 | 6/2001 | Takahashi et al. |
| 6,691,025 B2 | 2/2004 | Reimer |
| 6,880,392 B2 | 4/2005 | Lee et al. |
| 7,239,155 B2 | 7/2007 | Byington et al. |
| 2002/0109511 A1 | 8/2002 | Frank |
| 2003/0117153 A1 | 6/2003 | McKenzie et al. |
| 2004/0004487 A1 | 1/2004 | Vanzuilen et al. |
| 2004/0017211 A1 | 1/2004 | Kelley et al. |
| 2004/0251919 A1 | 12/2004 | Stahlmann et al. |
| 2007/0017291 A1 | 1/2007 | Cypes et al. |
| 2007/0119416 A1 | 5/2007 | Boyarski |
| 2007/0203668 A1 | 8/2007 | Reimer et al. |
| 2007/0204679 A1 | 9/2007 | Fitch et al. |

FUEL DELIVERY SYSTEM AND METHOD

BACKGROUND

The present invention relates to a system and method for using a fuel sensor module that is integrated with a fuel delivery module.

Many internal combustion engines require information related to a fuel that is in a fuel tank to provide the proper air/fuel mixture and ignition timing. Conventional systems use an oxygen sensor in the exhaust stream to determine the required information. As a result, the fuel delivery module cannot make necessary adjustments until a steady state operating condition has been reached. Additionally, in some instances, the quality of the fuel may be so poor that it will not burn, or if it does burn, it can cause damage to the engine.

SUMMARY

In one embodiment, the invention provides a system for delivering a fuel to an internal-combustion engine based on one or more characteristics of a fuel in a tank. The system includes a first ultrasonic transducer, a temperature sensor, and a controller. The first ultrasonic transducer is configured to generate an output, and the temperature sensor is configured to generate an output. The controller is configured to generate a plurality of control signals, send at least one of the plurality of control signals to the first ultrasonic transducer, receive the output from the first ultrasonic transducer, receive the output from the temperature sensor, determine one or more characteristics of the fuel based on the output of the first ultrasonic transducer and the output of the temperature sensor, and compare the one or more characteristics of the fuel to a set of characteristics of a first fuel type and a second fuel type. The system then sends a control signal to a fuel delivery device if the one or more characteristics call outside a predetermined set of boundary conditions.

In another embodiment, the invention provides a method of delivering a fuel to an engine based on one or more characteristics of the fuel in a tank. The method includes configuring a controller to generate a plurality of control signals, transmitting a first control signal to a first ultrasonic transducer, transmitting an output of the first ultrasonic transducer to the controller in response to the first control signal, transmitting an output of a capacitance sensor to the controller, and transmitting an output of a temperature sensor to the controller. The method also determining a set of characteristics of the fuel based on the output of the first ultrasonic transducer, the output of the temperature sensor, and the output of the capacitance sensor. The set of characteristics of the fuel is then compared to a set of characteristics of a first fuel type and a second fuel type, and a fuel delivery device is controlled based on the characteristics of the fuel.

In yet another embodiment, the invention provides a method of delivering a fuel to an engine based on one or more characteristics of the fuel in the tank. The method includes configuring a controller to generate a plurality of control signals, transmitting the control signals to a first ultrasonic transducer, a capacitance sensor, and a temperature sensor, and receiving a plurality of output signals from the first ultrasonic transducer, capacitance sensor, and temperature sensor in response to the control signals. The method also includes determining a set of characteristics of the fuel based on the plurality of output signals, altering the delivery of the fuel to the engine based on the set of characteristics of the fuel, and disabling a fuel delivery system when the fuel does not satisfy a set of predetermined boundary conditions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
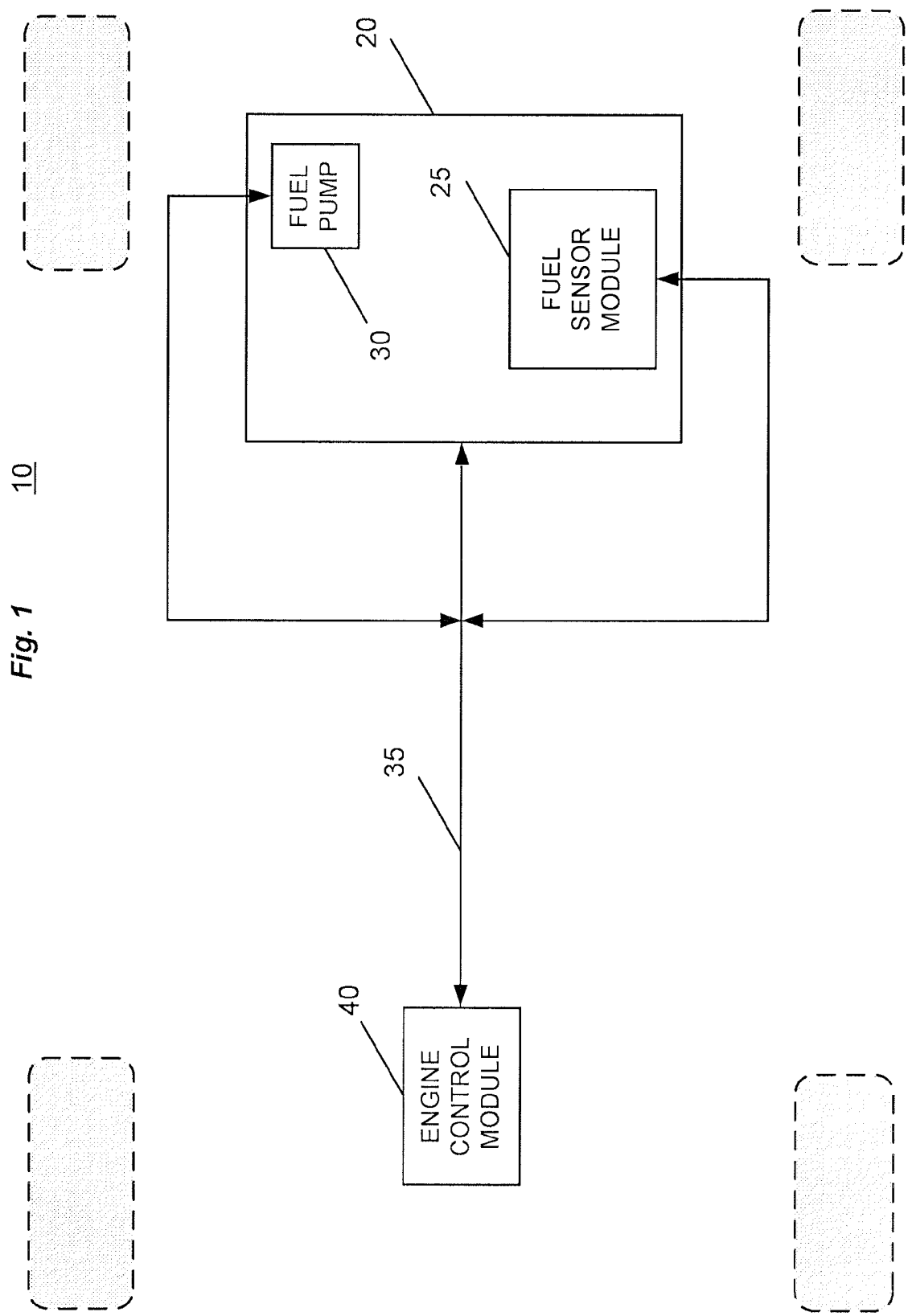
FIG. 1 illustrates fuel delivery system in a vehicle that includes a fuel sensor module according to an embodiment of the invention.

FIG. 1 illustrates a fuel delivery system of a vehicle 10 that includes a fuel tank 20, a fuel sensor module 25, a fuel delivery device such as a fuel pump 30, a communication link 35, and an engine control module (ECM) 40. The vehicle 10 also includes an engine (not shown), such as, for example, an internal combustion engine. The fuel sensor module 25 and the fuel pump 30 are located inside the fuel tank 20 and, in most instances, are submersed in a fuel. The fuel sensor module 25 is configured to communicate with the fuel pump 30, as well as the ECM 40 which is coupled to the engine. The fuel sensor module 25, the ECM 40, and the fuel pump 30 are connected to and in communication with each other via the communication link 35. In some embodiments, the communication link 35 is, for example, a CAN (controller area network) bus. The fuel sensor module 25 sends information to and receives information from the ECM 40 over the communication link 35. The ECM 40 also sends information to and receives information from the fuel pump 30 over the communication link 35. In some embodiments, the fuel sensor module 25 and the fuel pump 30 communicate via wired links. In other embodiments, the fuel sensor module 25, ECM 40, and fuel pump 30 communicate via a wireless communication link and network.

Figure 2:
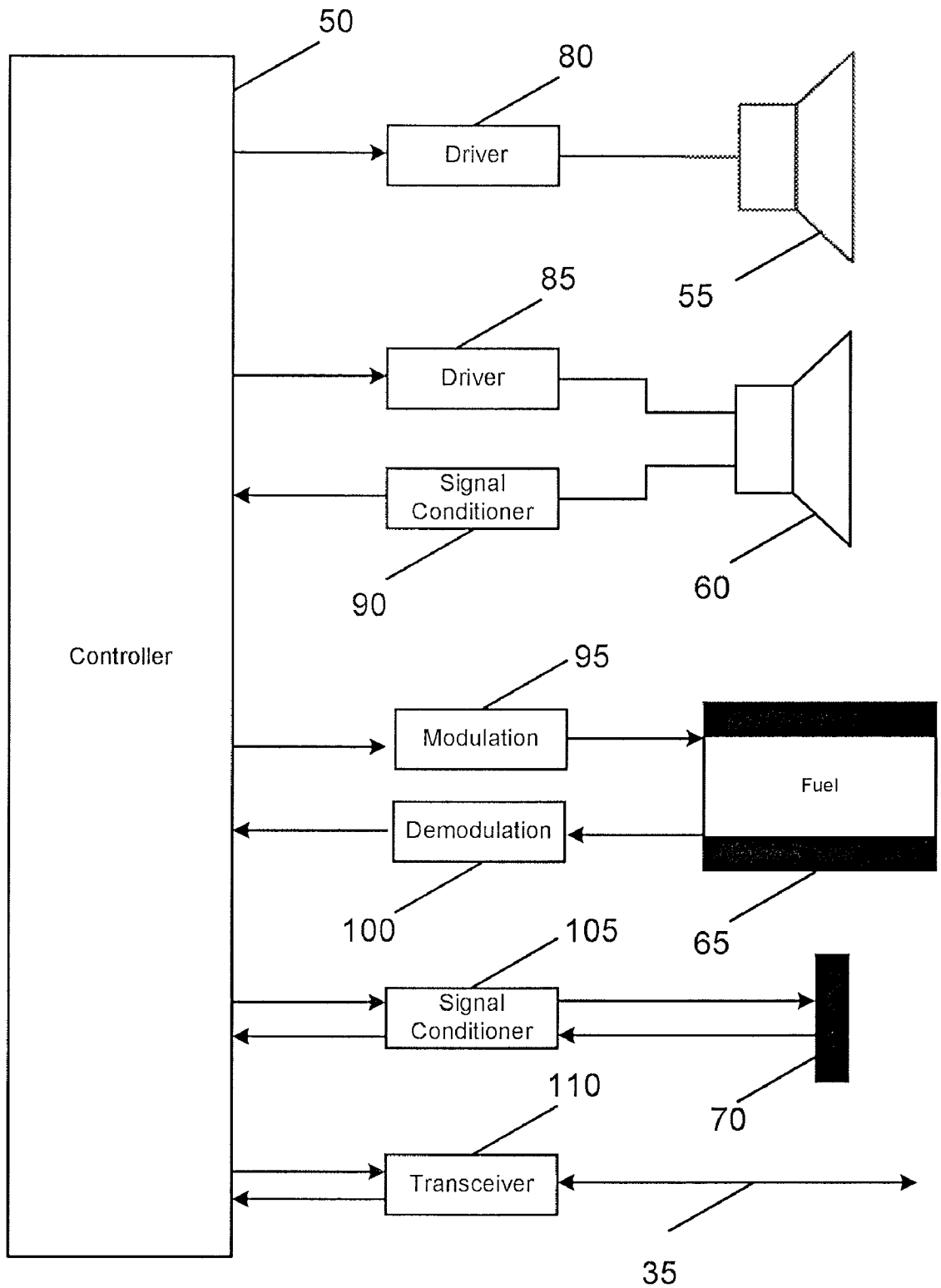
FIG. 2 illustrates a block diagram of a fuel sensor module according to an embodiment of the invention.

FIG. 2 illustrates a signal flow block diagram for the fuel sensor module 25. The fuel sensor module 25 includes a controller 50, a first ultrasonic transducer 55, a second ultrasonic transducer 60, a capacitance sensor 65, a temperature sensor 70, and the communication link 35. The controller 50 is a suitable electronic device, such as, for example, a microcontroller, a microprocessor, a Process Control Board (PCB), or the like. The controller 50 may include both hardware and software components, and is meant to broadly encompass a combination of such components. In some embodiments, the first ultrasonic transducer 55 and the second ultrasonic transducer 60 are, for example, ultrasonic piezoelectric transducers (PZT). The capacitance sensor 65 is, in some embodiments, a parallel plate capacitor. The controller 50 transmits information, such as a control signal, to the first and second ultrasonic transducers 55 and 60 through a first voltage driver 80 and a second voltage driver 85. The transducers 55 and 60 are configured to operate in a plurality of modes. For example, in one mode, the first ultrasonic transducer 55 generates and transmits an ultrasonic signal. The signal is reflected off a surface and detected by the second ultrasonic transducer 60. The ultrasonic signals detected by the second ultrasonic transducer 60 are sent through a signal conditioning device 90 before being returned to the controller 50. The signal conditioning device 90 can be a filter, an amplifier, an analog-to-digital converter, a digital-to-analog converter, or the like. The signal conditioning device is necessary to match, for example, an output of the controller with input values required by a load element (e.g. an ultrasonic transducer, a temperature sensor, etc.) or vice versa.

In one embodiment, the capacitance sensor 65 includes two plates. A fuel occupying the space between the plates functions as a dielectric material. The signals sent to the capacitance sensor 65 are, for example, alternating current (AC) signals. The AC signals pass through a modulation device 95 to increase the frequency of the signal. The AC signal alternately charges the parallel plates and a voltage is generated across the capacitance sensor 65. Using a relationship between the AC signal and the voltage across the capacitance sensor 65 (the voltage across and current through the capacitance sensor 65 are in quadrature), the controller 50 calculates the capacitance of the capacitance sensor 65. A return signal from the capacitance sensor 65 (e.g., a measure of the voltage across the capacitance sensor 65) is passed through a demodulating device 100 before the signal returns to the controller 50. In some embodiments, the controller 50 is configured to vary the modulation frequency to adjust the frequency of the alternating current through the capacitance sensor 65 and, consequently, the voltage across the capacitance sensor 65. A change in frequency results in a change in capacitance. By monitoring the changes in capacitance that occur with a change in frequency, the controller 50 is able to calculate a dielectric constant of the fuel between the parallel plates. In some embodiments, different ways of calculating the dielectric constant are used. In other embodiments, the capacitance sensor 65 is not included in the fuel sensor module 25 and the dielectric constant is not calculated.

The temperature sensor 70 is also coupled to the controller 50. A control signal is sent by the controller 50, through a signal conditioning device 105, before reaching the temperature sensor 70. The control signal causes the temperature sensor 70 to generate and send an output signal back to the controller 50. The output signal from the temperature sensor 70 is sent through a signal conditioning device 105, such as a type described above, before reaching the controller 50. The controller 50 is also coupled to the communication link 35. The communication link 35, via a transceiver 110, allows the controller 50 to send information to and receive information from other systems within the vehicle 10, such as, for example, the engine control module 40. Other embodiments of the fuel sensor module 25 include additional sensing devices, components, or modes of operation.

Figure 3:
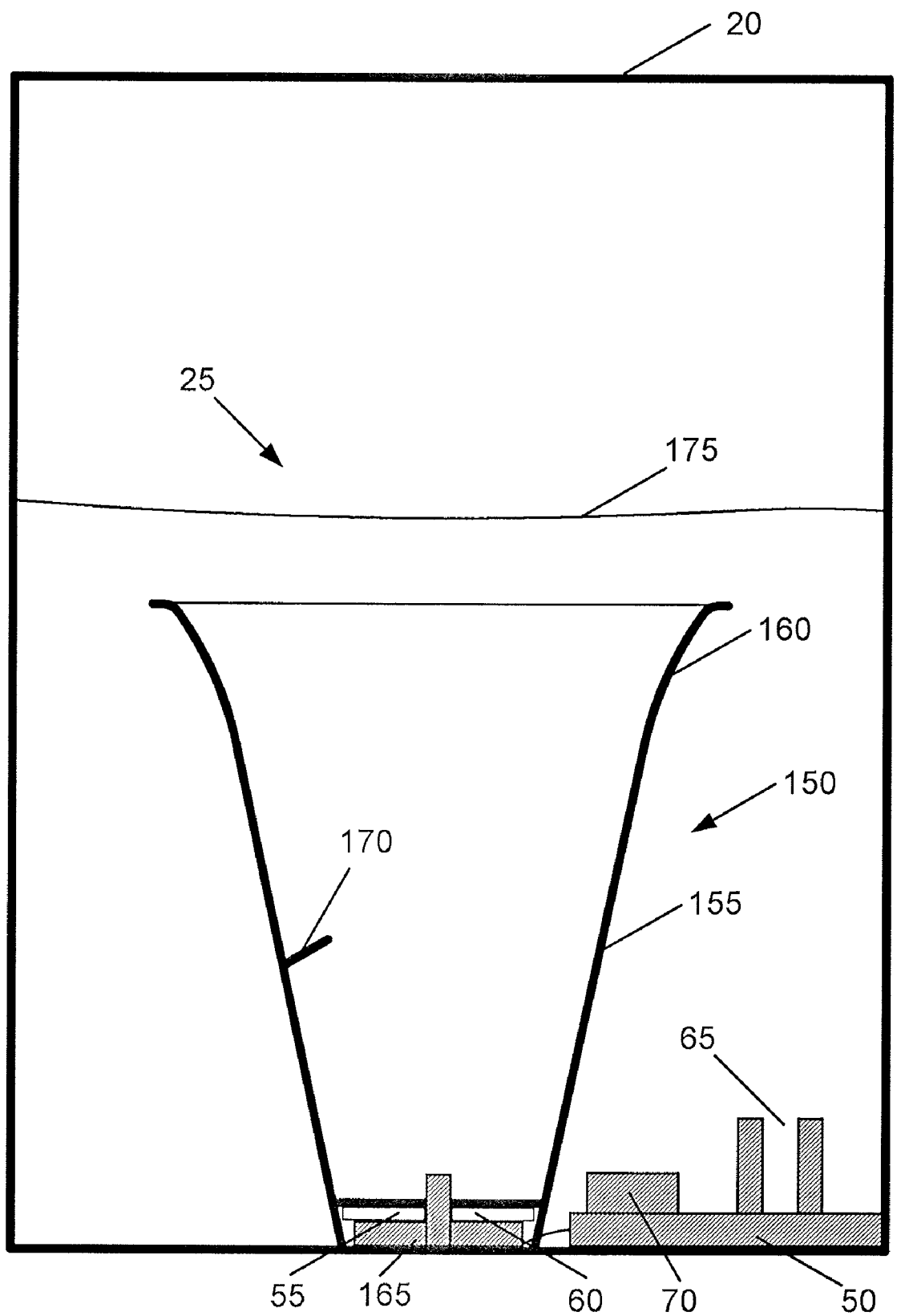
FIG. 3 illustrates a cross sectional view of a fuel sensor module according to an embodiment of the invention.

FIG. 3 illustrates the fuel sensor module 25 located inside the fuel tank 20. The fuel sensor module 25 is located adjacent to the bottom of the fuel tank 20 and includes the controller 50, the first ultrasonic transducer 55, the second ultrasonic transducer 60, the capacitance sensor 65, and the temperature sensor 70. In some embodiments, the fuel sensor module 25 includes a horn structure 150. The horn structure 150 includes a generally cylindrical wall 155 forming a hollow core, a tapered end 160, a base 165, and a target or reference protrusion 170. The tapered end 160 is opposite the base 165 and the reference protrusion 170 is located on the inside of the cylindrical wall 155 generally between the base 165 and the tapered end 160. The first and second ultrasonic transducers 55 and 60 are located at the base of the horn structure 150 in the hollow core of the cylindrical wall 155. The fuel tank 20 also includes a fuel surface 175. In other embodiments, the horn structure 150 is absent or configured differently. In embodiments with no horn structure 150, the reference protrusion 170 is at a different location inside the fuel tank 20, such as, for example, on the side of the fuel tank 20.

Figure 4:
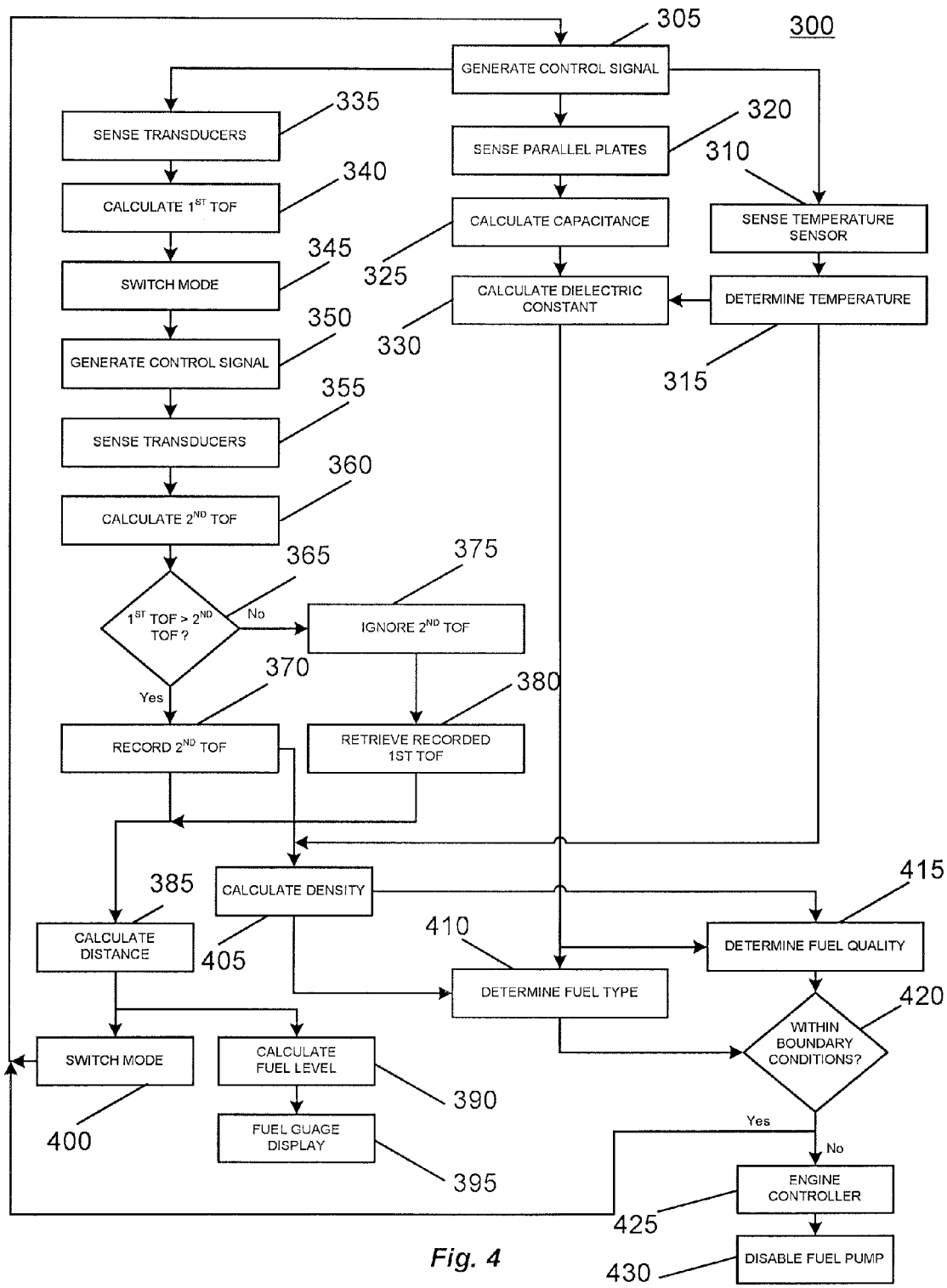
FIG. 4 illustrates a process for operating a fuel sensor module according to an embodiment of the invention.

FIG. 4 illustrates a process 300 for controlling the fuel sensor module 25. For descriptive purposes, the operation of the fuel sensor module 25 is divided into five sub-processes. The sub-processes include determining the temperature of a fuel in the fuel tank 20, calculating a dielectric constant, calculating a fuel level, calculating a density of the fuel in the fuel tank 20, and controlling the amount of fuel supplied to an engine. For each sub-process described, the fuel sensor module 25 begins operating when a vehicle's electrical system is activated. Each of the sub-processes is described in greater detail below.

Figure 5:
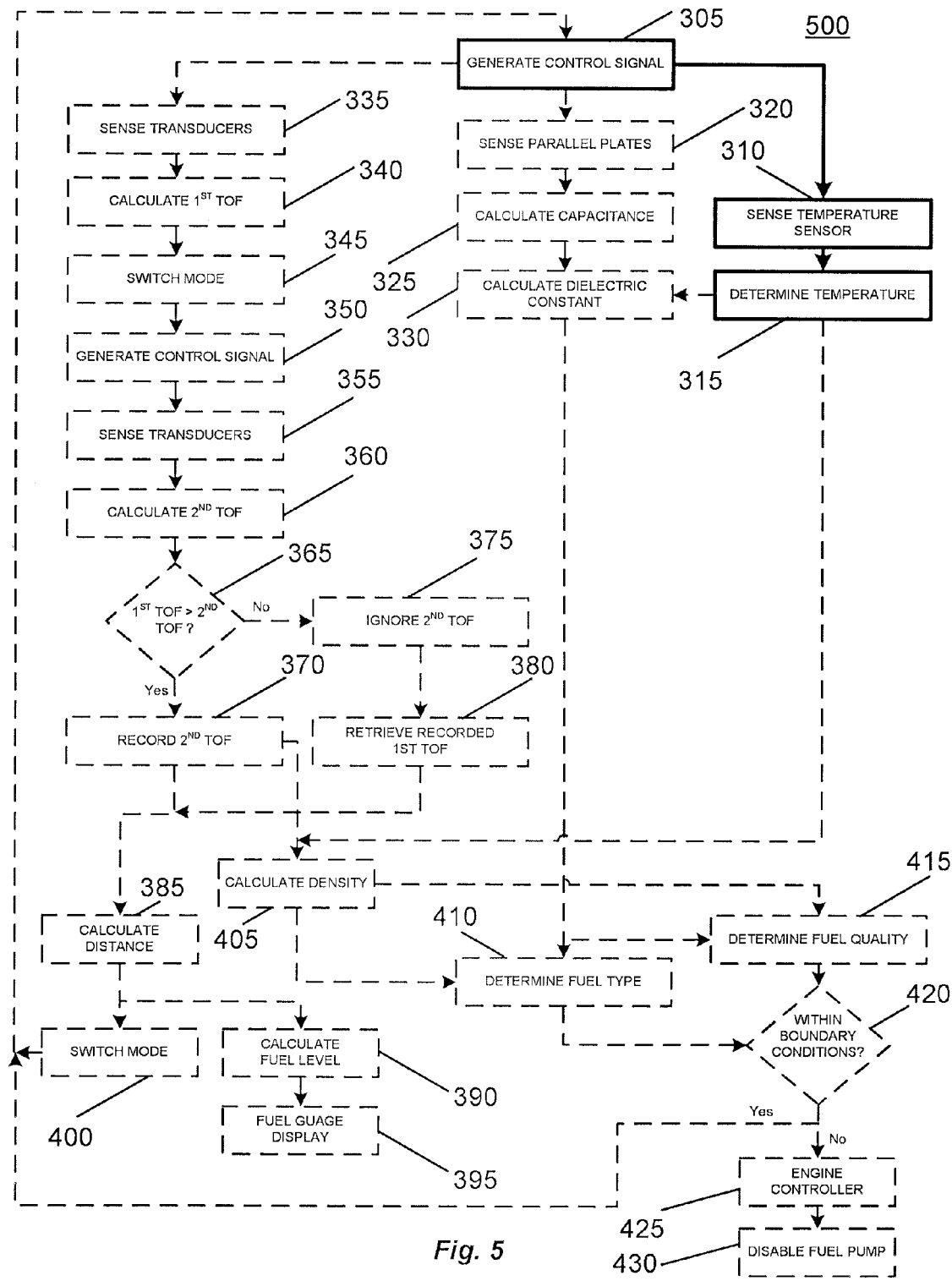
FIG. 5 illustrates a process for determining a temperature of a fuel according to an embodiment of the invention.

FIG. 5 illustrates a sub-process 500 for determining the temperature of the fuel in the fuel tank 20. The controller 50 generates a control signal (step 305). The temperature sensor 70 senses the temperature of the fuel in the fuel tank 20 (step 310) and generates an output signal which is proportional to the temperature of the fuel. The temperature sensor 70 is, in some embodiments, a thermistor or similar device. The signal generated by the temperature sensor 70 is sent to the controller 50. The controller 50 receives the temperature signal and stores it in, for example, a memory such as a RAM, a ROM, flash memory, a register, or the like. The signals sent between the controller 50 and the temperature sensor 70 are subject to signal conditioning as described above with respect to FIG. 2. The controller then determines the temperature of the fuel in the fuel tank 20 (step 315). In some embodiments of the invention, the controller 50 determines the temperature once every second. In other embodiments, different temperature determination intervals are used, or the temperature determination interval is set by a user.

Figure 6:
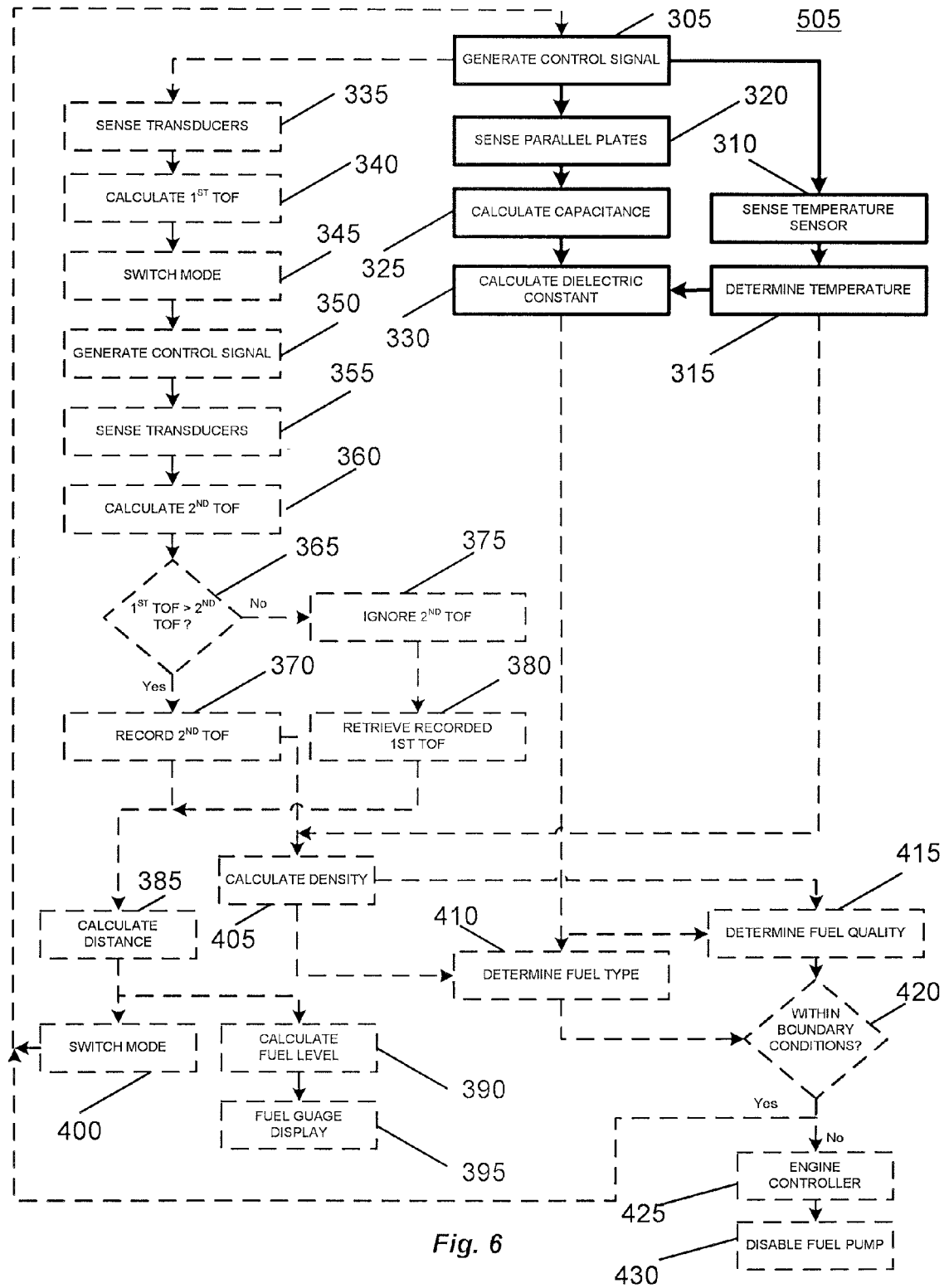
FIG. 6 illustrates a process for determining a dielectric constant of a fuel according to an embodiment of the invention.

FIG. 6 illustrates a sub-process 505 for calculating a dielectric constant of the fuel in the fuel tank 20. The sub-process 505 begins when the controller 50 generates a control signal which is sent to the capacitance sensor 65 (step 305). The control signal, such as the modulated AC signal described above, alternately charges the plates of the capacitance sensor 65 and generates a voltage across the capacitance sensor 65. The voltage across the parallel plates is sensed (step 320) and an output signal related to the voltage across the capacitance sensor 65 is demodulated and returned to the controller 50. The capacitance between the parallel plates of the capacitance sensor 65 is calculated by the controller 50 based on a known relationship between the control signal and the output signal if the capacitance sensor (step 325). In some embodiments, the controller 50 sends additional control signals to the capacitance sensor 65 and determines additional capacitance values. The additional control signals vary from the first control signal by, for example, frequency. As a result of the varying frequencies, different capacitance values are measured. The controller 50 receives the return signals from the capacitance sensor 65 and stores them in memory. The controller 50 also maintains a record of the control signals sent to the capacitance sensor 65 to track the changes in capacitance measurements with respect to the changes in control signals.

The dielectric constant is also dependent on the temperature of the fuel. Therefore, the controller 50 generates an additional control signal (step 305). The temperature sensor 70 then senses the temperature of the fuel in the fuel tank 20 (step 310) and generates an output signal which is proportional to the temperature of the fuel. The output signal generated by the temperature sensor 70 is sent to the controller 50. The controller 50 receives and stores the output signal in memory before determining the temperature of the fuel in the fuel tank 20 (step 315). The controller 50 retrieves the capacitance and temperature information from memory and calculates the dielectric constant of the fuel based on a known relationship among the changes in capacitance, the dielectric constant, and the temperature of the fuel.

Figure 7:
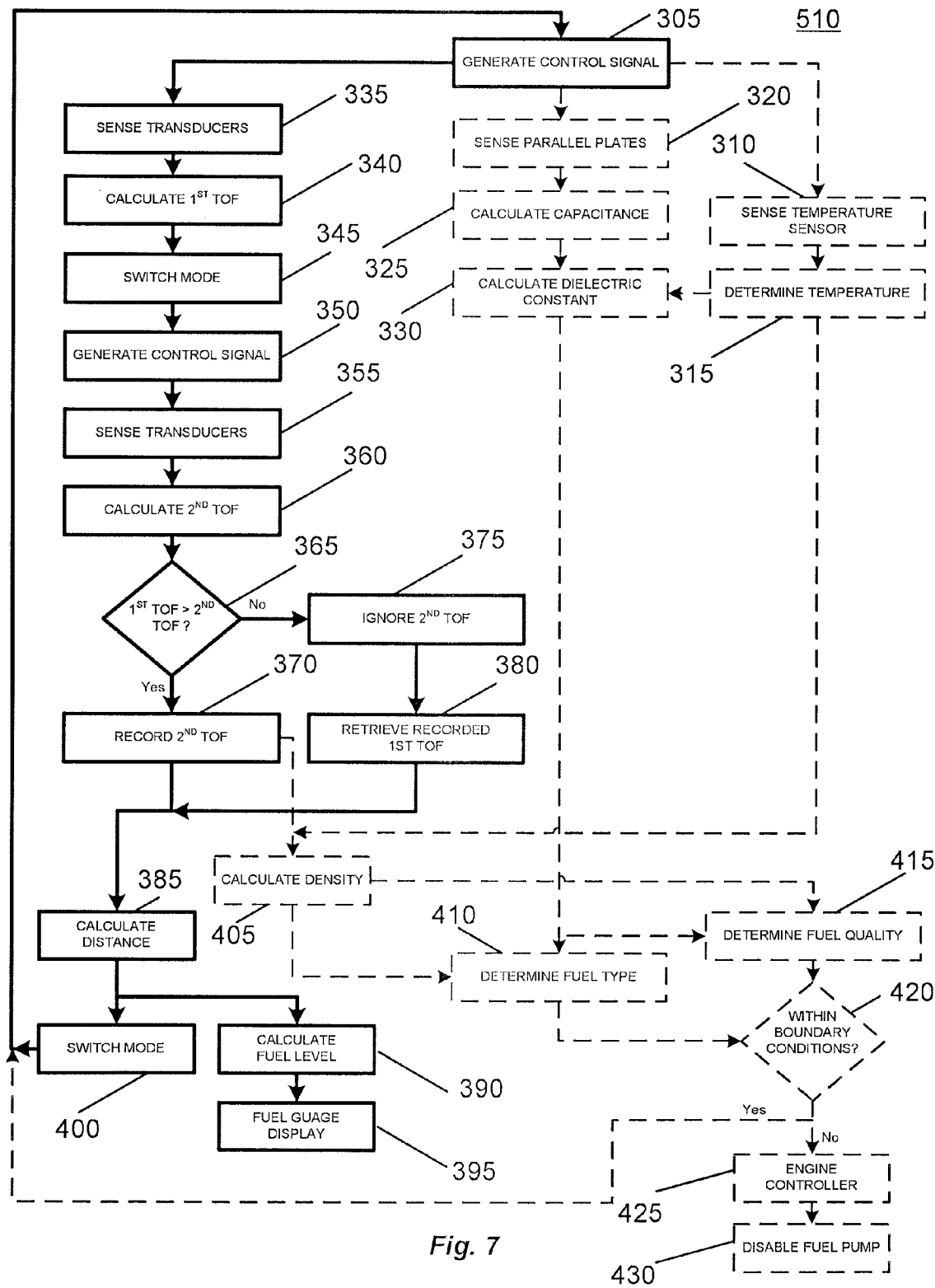
FIG. 7 illustrates a process for determining a fuel level according to an embodiment of the invention.

FIG. 7 illustrates a sub-process 510 for determining the fuel level in the fuel tank 20. The controller 50 generates a control signal and sends it to the first and second ultrasonic transducers 55 and 60 (step 305). The control signal causes the first and second ultrasonic transducers 55 and 60 to generate at least one ultrasonic signal. The ultrasonic signal is transmitted through the fuel in the fuel tank 20 and is reflected back to the transducers 55 and 60. A time-of-flight (TOF) measurement of the ultrasonic signal is calculated and recorded by the controller 60. For example, the first ultrasonic signal is generated by the first ultrasonic transducer 55 and is reflected from the surface of the fuel 175 in the fuel tank 20 back to the second ultrasonic transducer 60 (step 335) where the ultrasonic signal is converted to an electrical signal. The controller 50 then calculates and stores a first TOF (step 340). After recording the first TOF, the controller 50 switches to a sensing mode (step 345) and generates a second control signal (step 350) such that a second ultrasonic signal is generated by the second ultrasonic transducer 60 and is reflected from the reference protrusion 170 back to the first ultrasonic transducer 55 (step 355) where the ultrasonic signal is converted to an electrical signal. The controller 50 then calculates a second TOF (step 360). If the first TOF is greater than the second TOF (step 365), the second TOF is recorded (step 370) and both the first TOF and the second TOF are used to calculate a distance to the surface of the fuel 175 (step 385). If the first TOF is not greater than the second TOF (step 365), the second TOF is ignored (step 375), the first time of flight is retrieved (step 380), and only the first TOF is used to calculate the distance to the surface of the fuel 175 (step 385). Based on the distance to the surface of the fuel 175 and known dimensions of the fuel tank 20, the controller 50 calculates a fuel level (step 390). A signal representing the calculated fuel level is then sent to a fuel display gauge (step 395) to give an operator an indication of the fuel level. After the distance to the surface of the fuel 175 has been calculated, the controller 50 switches back from the second mode to the first mode (step 400), and the fuel sensor module 25 then returns to a generate control signals step (step 305).

Figure 8:
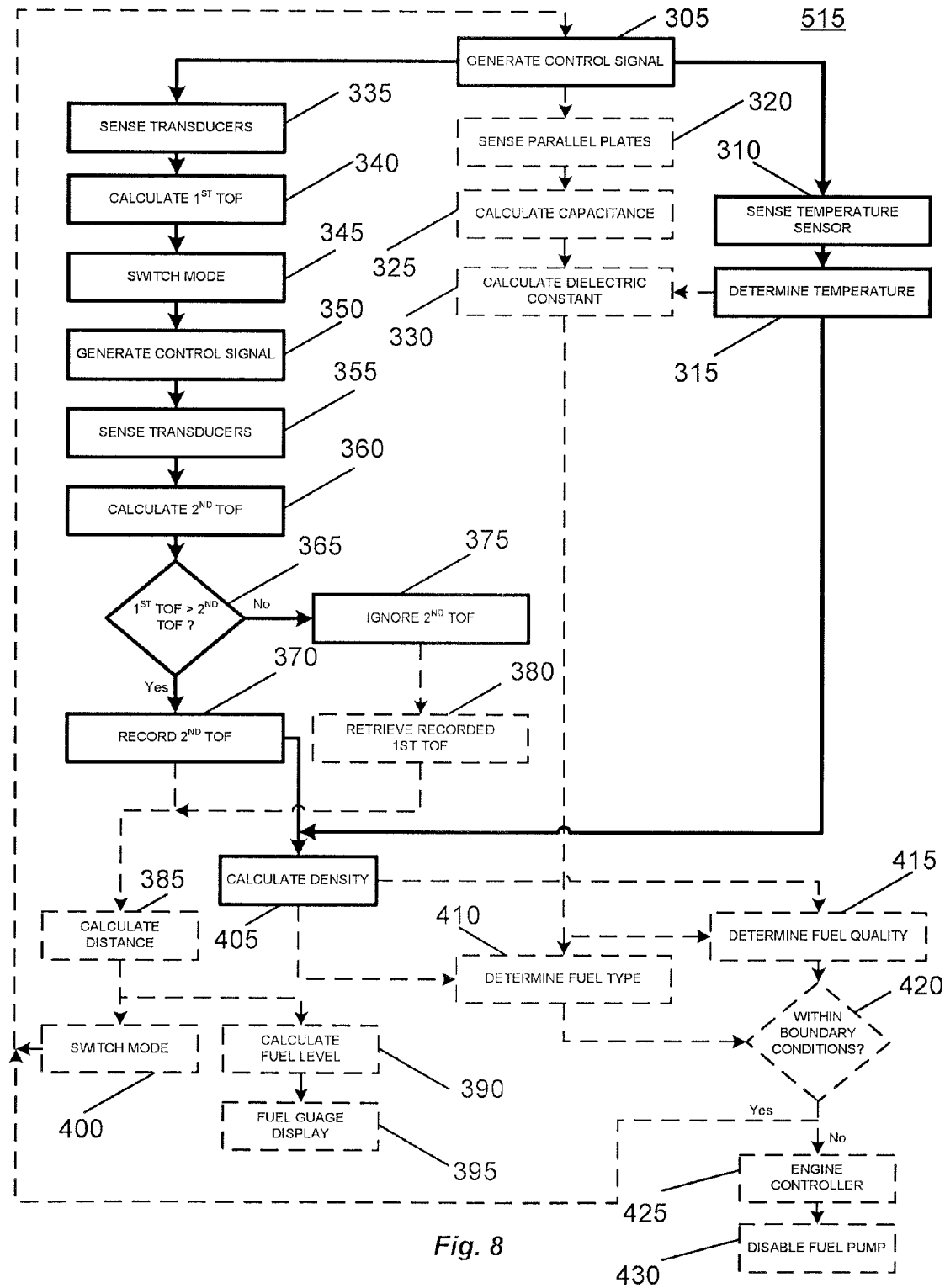
FIG. 8 illustrates a process for determining a fuel density according to an embodiment of the invention.

FIG. 8 illustrates a sub-process 515 for calculating a density of the fuel in the fuel tank 20. The controller 50 generates a first control signal and sends it to the first and second ultrasonic transducers 55 and 60. The control signal causes the first and second ultrasonic transducers 55 and 60 to generate at least one ultrasonic signal. For example, the first ultrasonic signal is generated by the first ultrasonic transducer 55 and is reflected from the surface of the fuel 175 in the fuel tank 20 back to the second ultrasonic transducer 60 (step 335) where the ultrasonic signal is converted to an electrical signal. The controller 50 then calculates and stores a first TOF (step 340). After recording the first TOF, the controller 50 switches a sensing mode (step 345) and generates a second control signal (step 350) such that a second ultrasonic signal is generated by the second ultrasonic transducer 60 and is reflected from the reference protrusion back to the first ultrasonic transducer 55 (step 355) where the ultrasonic signal is converted to an electrical signal. The controller 50 then calculates a second TOF (step 360).

The controller 50 also generates a second control signal for the temperature sensor 70 in parallel with the first control signal being sent to the first and second ultrasonic transducers 55 and 60. The temperature sensor 70 senses the temperature of the fuel in the fuel tank 20 and generates an output signal which is proportional to the temperature of the fuel. The output signal generated by the temperature sensor is sent to the controller 50. The controller 50 receives the output signal and stores it to memory. The controller 50 retrieves the first TOF and temperature values from memory. If the first TOF is greater than the calculated second TOF (step 365), the second TOF is recorded (step 370). The second TOF and the temperature of the fuel are then used to calculate the density of the fuel (step 405). If the first TOF is not greater than the second TOF (step 365), the second TOF is ignored (step 375) and the density of the fuel is not calculated.

Figure 9:
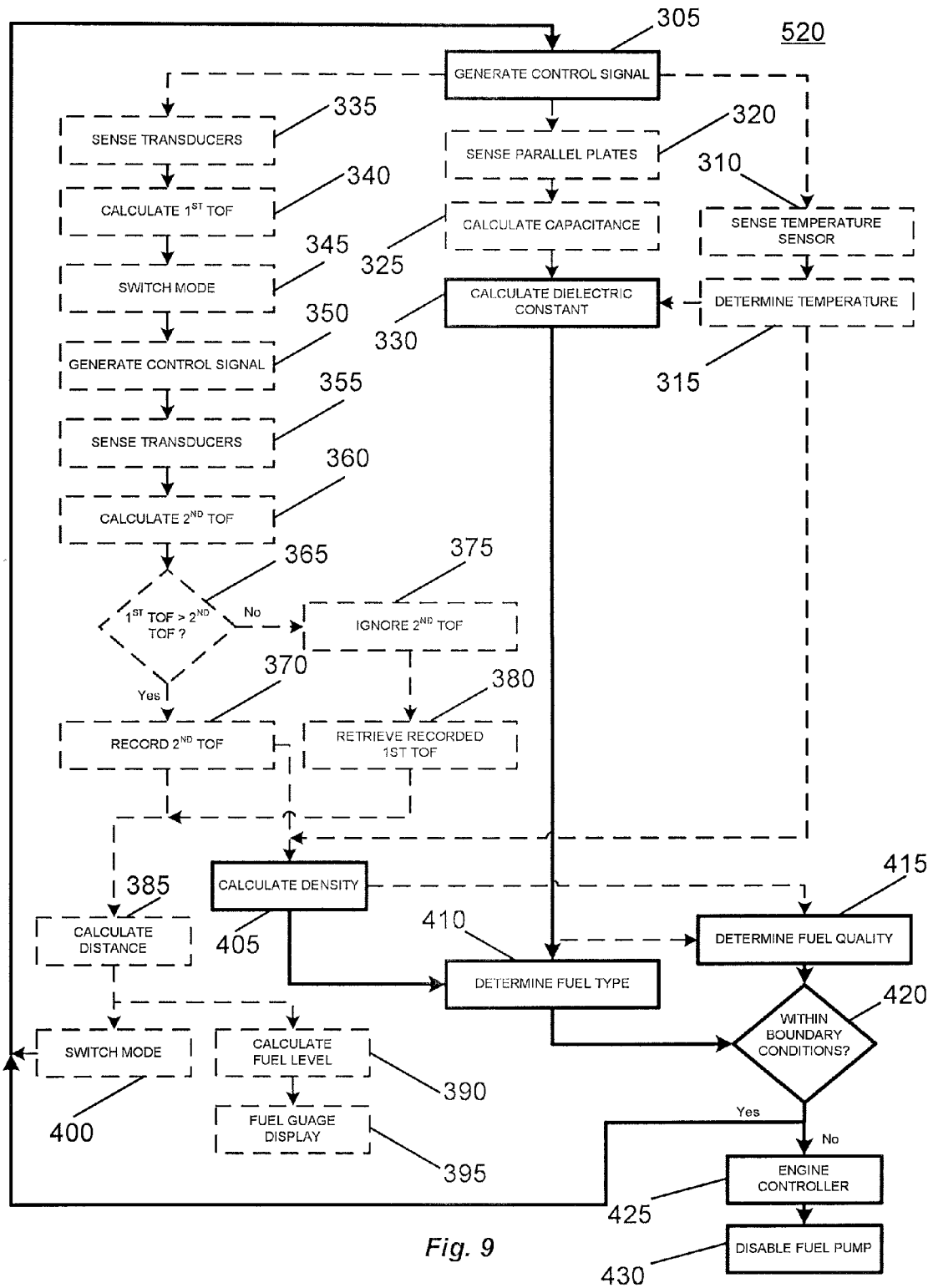
FIG. 9 illustrates a process for controlling an amount of fuel supplied to an engine according to an embodiment of the invention.

FIG. 9 illustrates a sub-process 520 for controlling the amount of a fuel that is supplied to an engine. After calculating values for the dielectric constant (step 330) and the density (step 405) of the fuel, the values are used to determine both a fuel type (step 410) and a fuel quality (step 415). After determining the fuel type and fuel quality, the controller 50 determines whether the fuel type and fuel quality are within an acceptable range of values (step 420). For example, some vehicles do not function, or do not function well, if an incorrect fuel is in the fuel tank 20. Therefore, in embodiments of the invention, the controller 50 includes a table or list (in memory) of fuel or fuel types for which the vehicle 10 is capable of operating. With regard to fuel type, a fuel on the list of acceptable fuel types satisfies the requirements of the boundary conditions. If the fuel in the fuel tank 20 is on the list of acceptable fuels, the sub-process 520 returns to a generate control signal step (step 305). If the controller determines that the fuel is not on the list of acceptable fuels, the boundary conditions are not satisfied and the controller 50 sends a signal to the engine control module 40 (step 425) to disable, for example, the fuel pump 30 (step 430). Disabling the fuel pump 30 prevents (or helps prevent) the unacceptable fuel from being supplied to the engine. In some embodiments, the fuel type is determined solely from the density calculation without using the dielectric constant and the dielectric constant is not calculated.

After determining the fuel type, the controller 50 determines whether the fuel quality satisfies a set of fuel quality boundary conditions (step 420). The fuel quality boundary conditions for fuel quality are established to stop unacceptably low quality fuels from being supplied to the engine. In some embodiments, each acceptable fuel type for the vehicle 10 includes a corresponding set of fuel quality boundary conditions stored in the controller 50. In other embodiments, the same set of fuel quality boundary conditions is used for each fuel. For example, some fuels contain impurities which, in some instances, prevent the fuel from burning. Alternately, some fuels contain impurities which can cause damage to an engine if burned. As described above with respect to the fuel type, if the fuel quality boundary conditions are satisfied, the sub-process 520 returns to the generate control signals step (step 305). However, if the fuel quality boundary conditions are not satisfied, the controller 50 sends a signal to the engine control module 40 (step 425) to disable, for example, the fuel pump 30 (step 430) to prevent the unacceptable fuel from being supplied to the engine.

The controller 50 also takes additional actions to control the fuel being supplied to the engine. For example, additional sets of conditions are used in embodiments of the invention to control the ratio of fuel and air being supplied to the engine. If the fuel is of an acceptable type and the fuel quality is at an acceptable level, but factors such as density, dielectric constant, and temperature vary from their expected values, the ratio of the fuel and air being supplied to the engine is varied to accommodate for the disparities. For example, in one embodiment, multiple sets of boundary conditions are set for each of the dielectric constant, temperature, and density, for each acceptable fuel type. A scaled or assigned value is given to each characteristic depending on the measured or determined value of the respective characteristic. For example, a density calculation that exactly equals an expected value is assigned a zero. Similar determinations are made for the remaining characteristics. In some embodiments a binary system is used. When combined, the assigned values for each characteristic create, for example, a three digit number (e.g., 011) or a six digit number (e.g. 000101). The number of digits used to represent a characteristic is dependent on the number of sets of boundary conditions defined for each characteristic. The controller 50 then looks up the three or six digit number in a table stored in memory to determine a proper fuel-to-air ratio to supply to the engine. Other methods of controlling the fuel being supplied to the engine are used in additional embodiments.

The embodiments described above and illustrated in the figures are presented by way of example only and are not intended as a limitation upon the concepts and principles of the present invention.

Thus, the invention provides, among other things, a system and method determining a plurality of characteristics of a fuel and controlling a fuel delivery system based on those characteristics. Various features and advantages of the invention are set forth in the following claims. Various features and advantages of the invention are set forth in the following claims.

What is claimed is:

1. A system for delivering a fuel to an internal-combustion engine based on one or more characteristics of a fuel in a tank, the system comprising:
    a first ultrasonic transducer configured to generate an output;
    a temperature sensor configured to generate an output; and
    a controller configured to
        generate a plurality of control signals,
        send at least one of the plurality of control signals to the first ultrasonic transducer,
        receive the output of the first ultrasonic transducer,
        receive the output of the temperature sensor,
        determine one or more characteristics of the fuel based on the output of the first ultrasonic sensor and the output of the temperature sensor,
        compare the one or more characteristics of the fuel to a set of characteristics of a first fuel type and a second fuel type, and
        send a control signal to a fuel delivery device if at least one of the one or more characteristics fall outside a predetermined set of boundary conditions.

2. The system of claim 1, wherein the first fuel type is gasoline and the second fuel type is diesel.

3. The system of claim 1, further comprising a capacitance sensor configured to generate an output, and wherein the controller is configured to receive the output of the capacitance sensor and determine one or more characteristics of the fuel based on the output of the first ultrasonic sensor, the output of the temperature sensor, and the output of the capacitance sensor.

4. The system of claim 3, wherein the controller is configured to calculate a dielectric constant for the fuel based on the output of the capacitance sensor.

5. The system of claim 1, wherein the controller is further configured to determine a fuel level in the tank based on the output of the first ultrasonic sensor.

6. The system of claim 1, wherein the set of characteristics of the fuel include a fuel quality.

7. The system of claim 1, wherein the set of characteristics of the fuel include a fuel type.

8. The system of claim 1, wherein the first ultrasonic transducer and the temperature sensor are configured to be located in the fuel tank and immersed in the fuel.

9. The system of claim 8, wherein the controller is configured to be located in the fuel tank and immersed in the fuel.

10. The system of claim 1, further comprising
    a second ultrasonic transducer; and
    a reference target positioned a first distance from the first ultrasonic transducer and a second distance from the second ultrasonic transducer.

11. The system of claim 10, wherein the controller is configured to switch between a first operating mode and a second operating mode,
    wherein the first operating mode includes sending a first control signal to the first ultrasonic transducer to generate a first signal and receiving a second signal from the second ultrasonic transducer based on a reflection of the first signal from a surface of the fuel in the tank, and
    wherein the second operating mode includes sending a second control signal to the second ultrasonic transducer to generate a third signal and receiving a fourth signal from the first ultrasonic transducer based on a reflection of the third signal from the reference target.

12. The system of claim 11, wherein the controller is configured to determine a distance to the surface based on at least one of the second signal or the fourth signal.

13. A method of delivering a fuel to an engine based on one or more characteristics of the fuel in a tank, the method comprising:
    configuring a controller to generate a plurality of control signals;
    transmitting a first control signal to a first ultrasonic transducer;
    transmitting an output of the first ultrasonic transducer to the controller in response to the first control signal;
    transmitting an output of a capacitance sensor to the controller;
    transmitting an output of a temperature sensor to the controller;
    determining a set of characteristics of the fuel based on the output of the ultrasonic sensor, the output of the temperature sensor, and the output of the capacitance sensor;
    comparing the set of characteristics of the fuel to a set of characteristics of a first fuel type and a set of characteristics of a second fuel type; and
    controlling a fuel delivery device based on the characteristics of the fuel.

14. The method of claim 13, further comprising configuring the controller to determine a fuel level in the tank based on the output of the first ultrasonic sensor.

15. The method of claim 13, wherein determining a set of characteristics of the fuel includes determining a fuel quality.

16. The method of claim 13, wherein determining a set of characteristics of the fuel includes determining a fuel type.

17. The method of claim 13, further comprising submerging the first ultrasonic transducer, the capacitance sensor, and the temperature sensor in the fuel.

18. The method of claim 13, further comprising submerging the controller in the fuel.

19. The method of claim 13, further comprising configuring the controller to send a signal to disable the fuel delivery device when the fuel does not satisfy a set of predetermined boundary conditions.

20. The method of claim 13, further comprising positioning a reference target a first distance from the first ultrasonic transducer and a second distance from a second ultrasonic transducer.

21. The method of claim 20, further comprising switching the controller between a first operating mode and a second operating mode,
wherein the first operating mode includes sending a first control signal to the first ultrasonic transducer to generate a first signal and receiving a second signal from the second ultrasonic transducer based on a reflection of the first signal from a surface, and
wherein the second operating mode includes sending a second control signal to the second ultrasonic transducer to generate a third signal and receiving a fourth signal from the first ultrasonic transducer based on a reflection of the third signal from the reference target.

22. The method of claim 21, further comprising configuring the controller to determine a distance to the surface based on at least one of the second signal or the fourth signal.

23. The method of claim 13, further comprising calculating a dielectric constant for the fuel based on the output of the capacitance sensor.

24. The method of claim 13, further comprising determining a temperature of the fuel based on the output of the temperature sensor.

25. A method of delivering a fuel to an engine based on one or more characteristics of the fuel in a tank, the method comprising:
configuring a controller to generate a plurality of control signals;
transmitting the control signals to a first ultrasonic transducer, a capacitance sensor, and a temperature sensor;
receiving a plurality of output signals from the first ultrasonic transducer, capacitance sensor, and temperature sensor in response to the control signals;
determining a set of characteristics of the fuel based on the plurality of output signals;
altering the delivery of the fuel to the engine based on the set of characteristics of the fuel; and
disabling a fuel delivery system when the fuel does not satisfy a set of predetermined boundary conditions.

26. The method of claim 25, further comprising configuring the controller to determine a fuel level in the tank based on the plurality of output signals.

27. The method of claim 25, wherein determining a set of characteristics of the fuel includes determining a fuel quality.

28. The method of claim 25, wherein determining a set of characteristics of the fuel includes determining a fuel type.

29. The method of claim 25, further comprising submerging the first ultrasonic transducer, the capacitance sensor, and the temperature sensor in the fuel.

30. The method of claim 25, further comprising submerging the controller in the fuel.

31. The method of claim 25, further comprising positioning a reference target a first distance from the first ultrasonic transducer and a second distance from a second ultrasonic transducer.

32. The method of claim 31, further comprising switching the controller between a first operating mode and a second operating mode,
wherein the first operating mode includes sending a first control signal to the first ultrasonic transducer to generate a first signal and receiving a second signal from the second ultrasonic transducer based on a reflection of the first signal from a surface of the fuel in the tank, and
wherein the second operating mode includes sending a second control signal to the second ultrasonic transducer to generate a third signal and receiving a fourth signal from the first ultrasonic transducer based on a reflection of the third signal from the reference target.

33. The method of claim 32, further comprising configuring the controller to determine a distance to the surface based on at least one of the second signal or the fourth signal.

34. The method of claim 25, further comprising calculating a dielectric constant for the fuel based on the plurality of output signals including a measured capacitance.

35. The method of claim 25, further comprising determining a temperature of the fuel based on the plurality of output signals.

* * * * *